US006349241B1

(12) United States Patent
Peron et al.

(10) Patent No.: US 6,349,241 B1
(45) Date of Patent: Feb. 19, 2002

(54) METHOD AND APPARATUS FOR AUTOMATICALLY LAYING, CUTTING AND REMOVING MATERIAL ON AND FROM A CONTINUOUSLY MOVING CONVEYOR

(75) Inventors: Alberto Peron, Via Vincenzo Monti, 5, 36042 Breganze (IT); Alessandro Tamiello, Breganze (IT)

(73) Assignee: Alberto Peron, Breganze (IT)

(*) Notice: Subject to any disclaimer, the term of this patent is extended or adjusted under 35 U.S.C. 154(b) by 0 days.

(21) Appl. No.: 09/355,557

(22) PCT Filed: Feb. 2, 1998

(86) PCT No.: PCT/EP98/00534

§ 371 Date: Jul. 30, 1999

§ 102(e) Date: Jul. 30, 1999

(87) PCT Pub. No.: WO98/34767

PCT Pub. Date: Aug. 3, 1998

(30) Foreign Application Priority Data

Feb. 7, 1997 (IT) ........................................ VI97 A 0022

(51) Int. Cl.[7] ............................ B26F 1/38; B26D 5/00; G06F 19/00

(52) U.S. Cl. .......................... 700/134; 700/171; 83/939

(58) Field of Search ................................ 700/134, 135, 700/143, 167, 171; 83/939; 382/111; 112/470.05, 475.02, 475.07

(56) References Cited

U.S. PATENT DOCUMENTS 4,419,820 A 12/1983 Stumpf
4,917,030 A * 4/1990 Bisson et al. .......... 112/470.07
5,172,326 A 12/1992 Holshouser et al.
5,258,917 A 11/1993 Bruder et al.
6,205,370 B1 * 3/2001 Blaimschein et al. ....... 700/134

FOREIGN PATENT DOCUMENTS

EP A-0 387 371 9/1990

OTHER PUBLICATIONS

Vernay: "Decoupe De Costumes: Laser ET Temps Reel" Mesures Regulation Automatisme, vol. 52, No. 14, Nov. 23, 1987, pp. 37, 39/40, 42 XP002046913.

* cited by examiner

*Primary Examiner*—Peter Nerbun
(74) *Attorney, Agent, or Firm*—Guido Modiano; Albert Josif; Daniel J. O'Byrne

(57) ABSTRACT

A method for automatically cutting products, composed of a plurality of elementary pieces, such as items of clothing in general, shoes, leather goods, sofa upholstery and any other similar product, including the steps of: acquiring all the geometric characteristics and defectiveness characteristics of the material to be cut and storing all the above-described characteristics in an electronic memory so that they can be sent or retrieved automatically in real time for subsequent processing; optimizing the shapes to be cut in the material acquired in the previous step in a fully automatic manner and taking simultaneously into account all the characteristics of the acquired material and all the characteristics and rules according to which the elements that constitute the product must be cut and then assembled; removing, on said conveyor, said pieces cut in the previous step and managing them in single-product mode or as a pack; and sending, by computerized control system which controls the entire synchronization of the preceding steps in real time, all the information concerning the correct operation of the entire production sequence.

14 Claims, 11 Drawing Sheets

METHOD AND APPARATUS FOR AUTOMATICALLY LAYING, CUTTING AND REMOVING MATERIAL ON AND FROM A CONTINUOUSLY MOVING CONVEYOR

BACKGROUND OF THE INVENTION

The present invention relates to a fully automatic method and apparatus for cutting products composed of a plurality of basic elements (items of clothing, shoes, sofa upholstery, etcetera) which are fully or partially made of a material which can be laid on a moving surface and can be cut continuously without any external manual intervention on a conveyor which is moving continuously and at a variable speed. Machines that cut the fabric in a layer set and in single layers are currently known in the specific field of the cutting of items of clothing. These two methods, which are the current state of the art, require a layout study which cannot be performed on the actual fabric being acquired; accordingly, they do not take into account the characteristics of the fabric, such as stripes, checked patterns, flowers etcetera or flaws found during the actual cutting of the fabric.

Also in the specific case of single-layer cutting, the fabric is cut in "windows", where each window corresponds to a layout determined beforehand by optimization systems without taking into account the actual characteristics of the fabric that will be cut. In all these systems, the cutting logic system is practically the same, except for the fact that in the case of a layer set, a plurality of layers are cut simultaneously, while in the case of the single layer, the layering system is removed, eliminating this step but maintaining the entire logic system of the production system both upstream and downstream.

Examples of cutting systems are available from the documents U.S. Pat. No. 5,258,917, U.S. Pat. No. 4,419,820 and U.S. Pat. No. 5,172,326.

However, all such systems are operating sequentially, and need stoppings and human intervention.

SUMMARY OF THE INVENTION

The aim of the present invention is to revolutionize and fully automate, in all its parts, the laying, cutting and the cut part removal system for items of clothing and for products made entirely or partially of a material which can be laid on a moving surface to be cut, by providing a method and an apparatus which allow to cut any number of products, particularly items of clothing, continuously and automatically, attempting to minimize and ultimately eliminate all manual interventions.

This aim and other objects which will be described hereinafter are achieved by a method for automatically cutting in a continuous, real-time controlled operation, a material that can be laid over a continuously movable transport surface, the method comprising, in operational sequence, the steps of:

a) accommodating, in an automatic material magazine, materials to be cut in a predefined sequence;

b) removing from the material magazine and sending to a deposition system for subsequent deposition onto a continuously-moving transport surface, the material to be cut;

c) automatically depositing the material to be cut, so as to lay out in a layer on the transport surface which is moving continuously and at a variable speed;

d) acquiring all the geometric characteristics and defectiveness characteristics of a material surface to be cut and storing all said geometric and defectiveness characteristics in an electronic memory so as to be available for automatic, in real time, retrieval and processing;

e) optimizing the layout of shapes to be cut onto the material surface acquired in the previous step, in a fully automatic manner, by taking simultaneously into account all said geometric and defectiveness characteristics of the acquired material surface and outline characteristics regarding single product shapes and elementary piece shapes of complex products to be cut;

f) cutting said material laying out on said transport surface while moving continuously and at a variable speed therewith, the transport surface speed being adjustable so that the cutting step is started upon ending of the previous optimizing step;

g) removing from said continuously-moving transport surface the shapes cut during the previous step, and selectively depositing, either individually the single product shapes or, in respective packs, the elementary piece shapes for constituting a complex product; and h) continuously exchanging information concerning the correct operation of the entire production sequence (X1, X2, X3, X4) between a computerized control system (SLAVE) and an automatic production control and data management system (MAIN), and on the basis of said information controlling, in real time, the entire synchronization of the production operation.

The above-described method and the related apparatus entail considerable advantages in the cutting sequence and specifically allow the following improvements:

1) Manual or automatic layout and optimization of the pieces to be cut on screen on an ideal fabric is eliminated, since the layout is generated when the fabric is to be cut, taking exactly into account all the characteristics of the fabric, acquired by the sensing system, at cutting time.

2) All the checks for fabric flaws, which had to be conducted before placing the rolls in the store, are no longer required.

3) Production becomes highly flexible, since at any moment the system can decide to halt production, roll up the fabric being cut, automatically remove from the store a new fabric to be cut, lay and cut a number "n" of more urgent items, roll up the fabric of the urgent items, take up again the old fabric that was being cut and continue the temporarily halted production without any manual intervention. All this can be done without requiring any predefined layout and in real time, under the supervision of a management program (MAIN+SLAVE).

4) Fabric waste can be optimized better than in the current state of the art. When a fault is detected during fabric laying, current technology in fact allows to obviate this problem as shown in FIG. 1. The fabric is moved back and laying resumes from the last complete shape affected by the flaw. In this manner, however, extra item pieces are obtained which are unusable and therefore a portion of fabric is wasted over its entire width. With the present invention, instead, since the shapes are arranged on the fabric acquired by the fabric sensing system, the exact location of the flaws is known and it is therefore possible to arrange the shapes in the best possible manner, avoiding said flaw as shown in FIG. 2, achieving a better result in terms of waste caused by fabric flaws.

5) The system for automatically removing the pieces allows to supply production sequences according to conventional production methods, i.e., a production line, or to supply production islands, where items are produced at a single station in a fully automatic manner depending on the required production.

BRIEF DESCRIPTION OF THE DRAWINGS

Further characteristics and advantages of the apparatus according to the present invention will become apparent by accurately examining the system according to a preferred but not exclusive embodiment thereof, illustrated only by way of non-limitative example, for manufacturing items of clothing, with the aid of the accompanying drawings, wherein.

DESCRIPTION OF THE PREFERRED EMBODIMENTS

Figure 1:
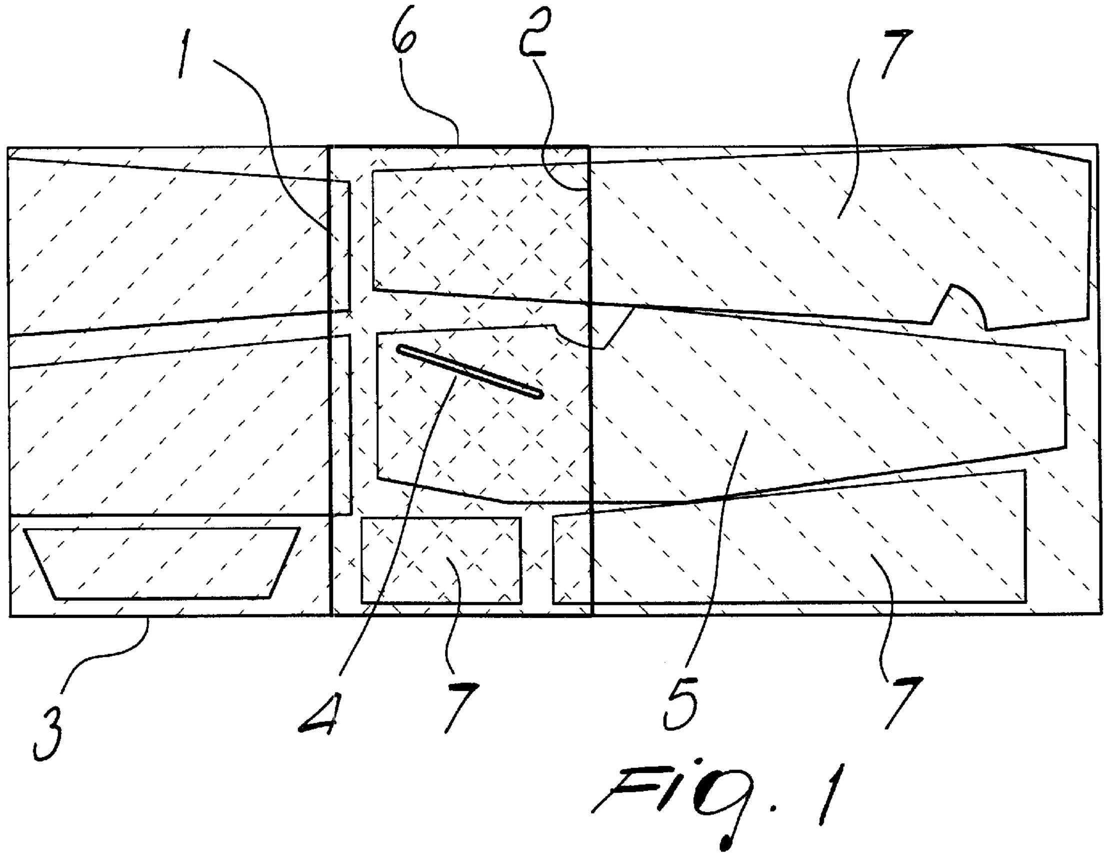
FIG. 1 illustrates, the current state of the art in the management of fabric flaws.
Figure 2:
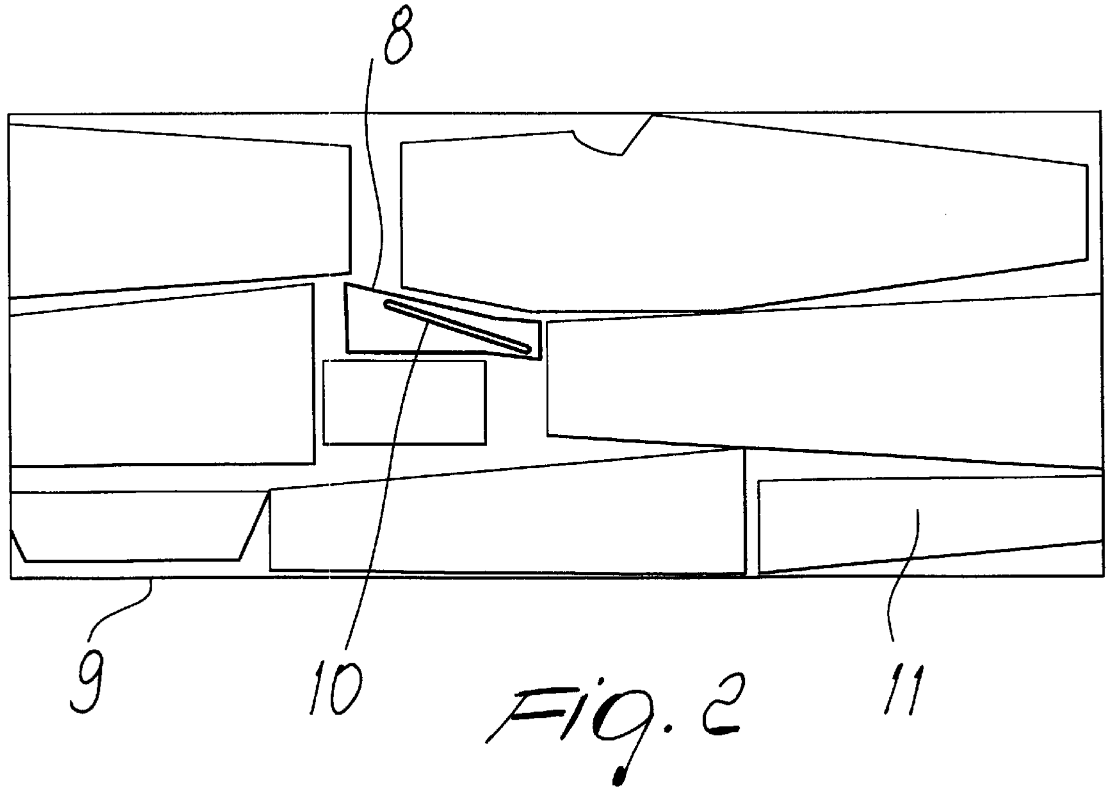
FIG. 2 illustrates the innovative method according to the present invention for handling fabric flaws.
Figure 3:
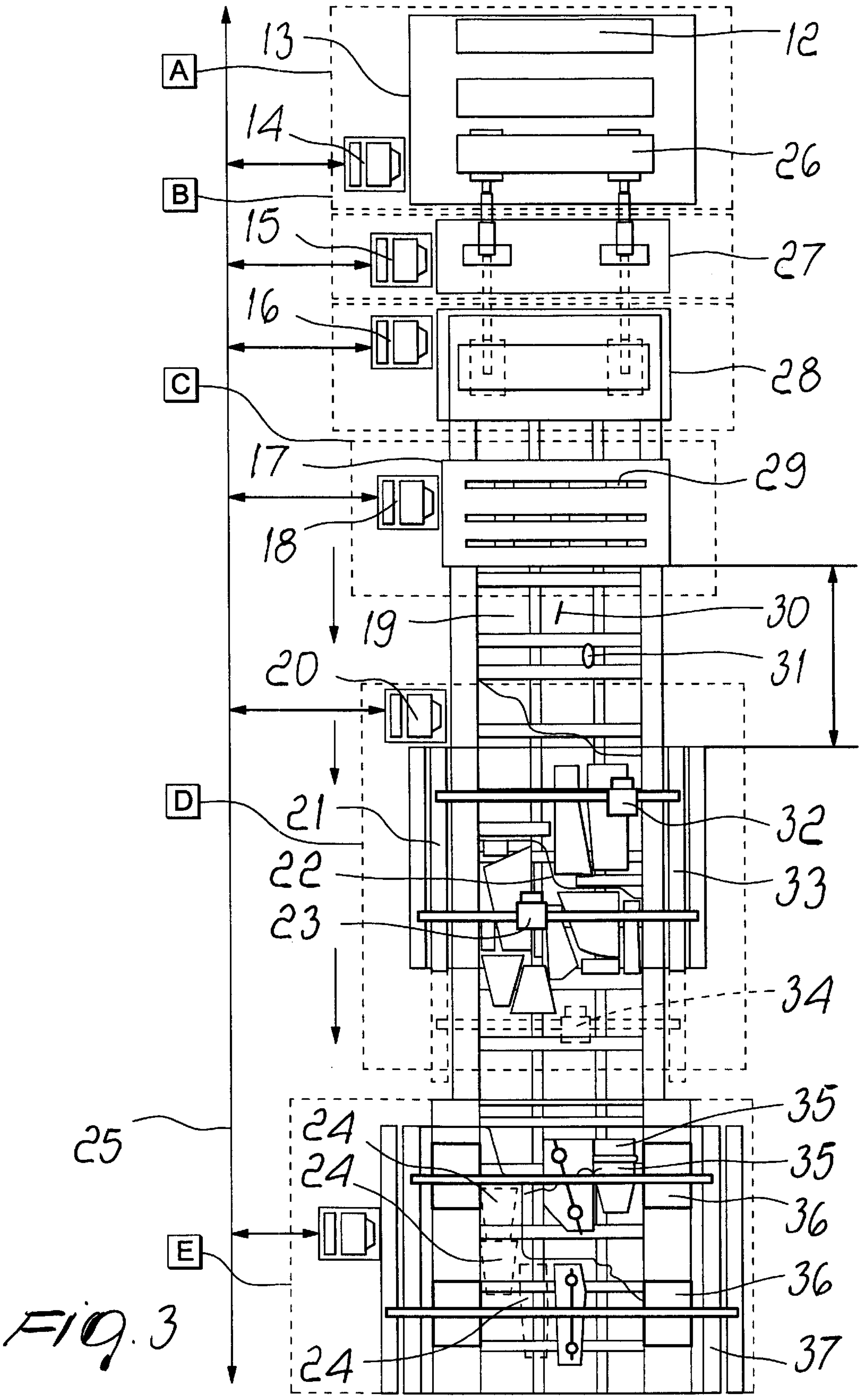
FIG. 3 is a general top view of the machine, illustrating all the above-described steps.
Figure 4:
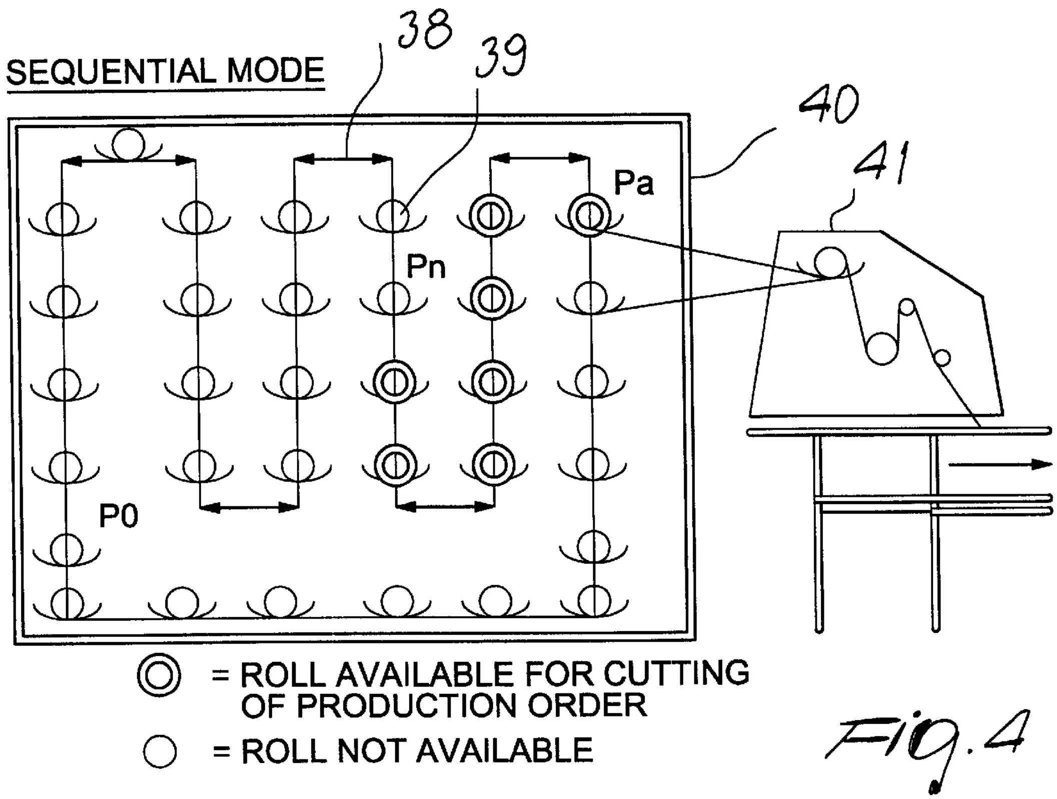
FIG. 4 is a view of the system for storing the fabrics for managing the store according to the logic mode that provides for sequential searching and management of the rolls of fabric.
Figure 5:
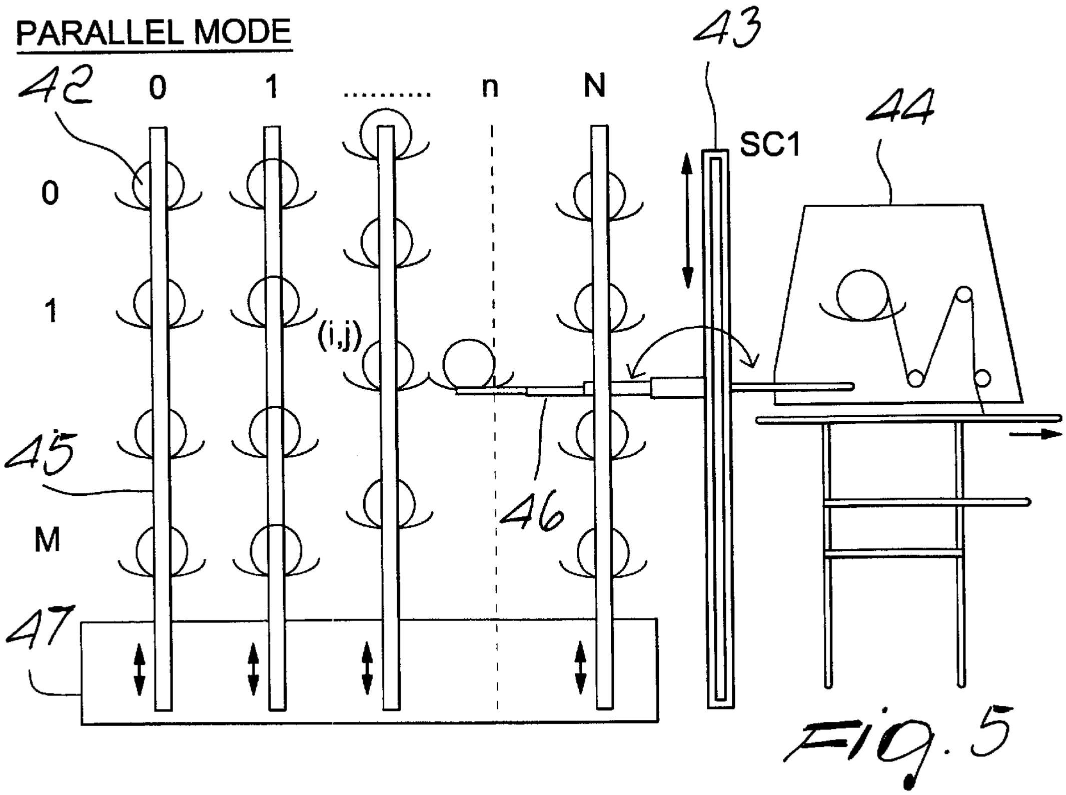
FIG. 5 is a view of a fabric storage system for managing the store according to the logic mode that provides for random (parallel) searching and management of the rolls of fabric.
Figure 6:
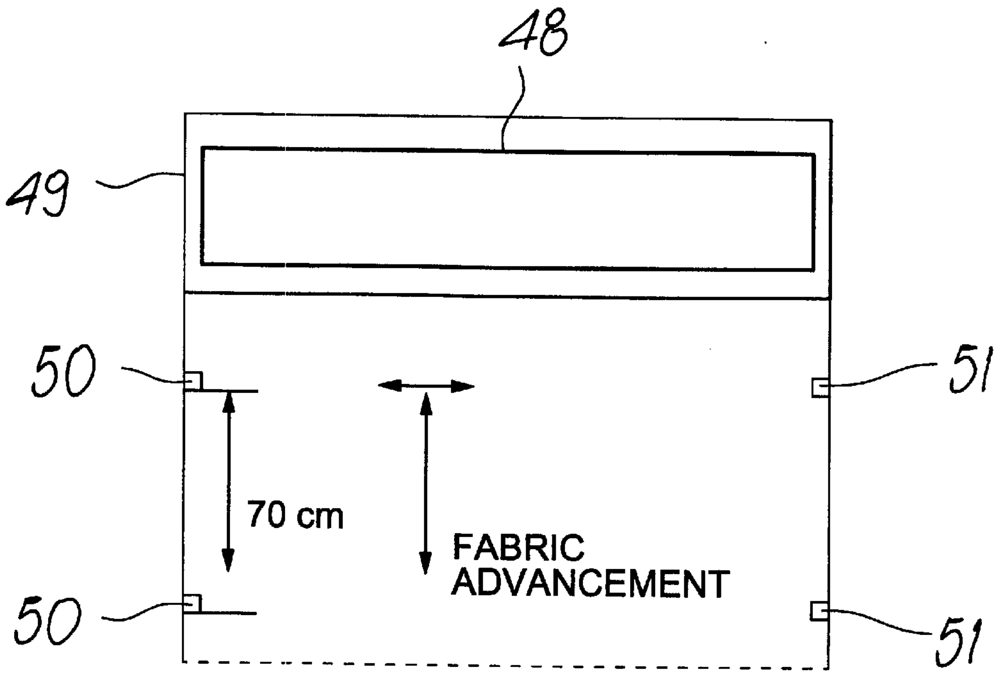
FIG. 6 is a view of an acquisition system for checking the exact linearity of the fabric during the unrolling of said fabric on the part of the automatic unrolling unit and the corresponding checking of the correct linearity of the laying of the fabric.
Figure 7:
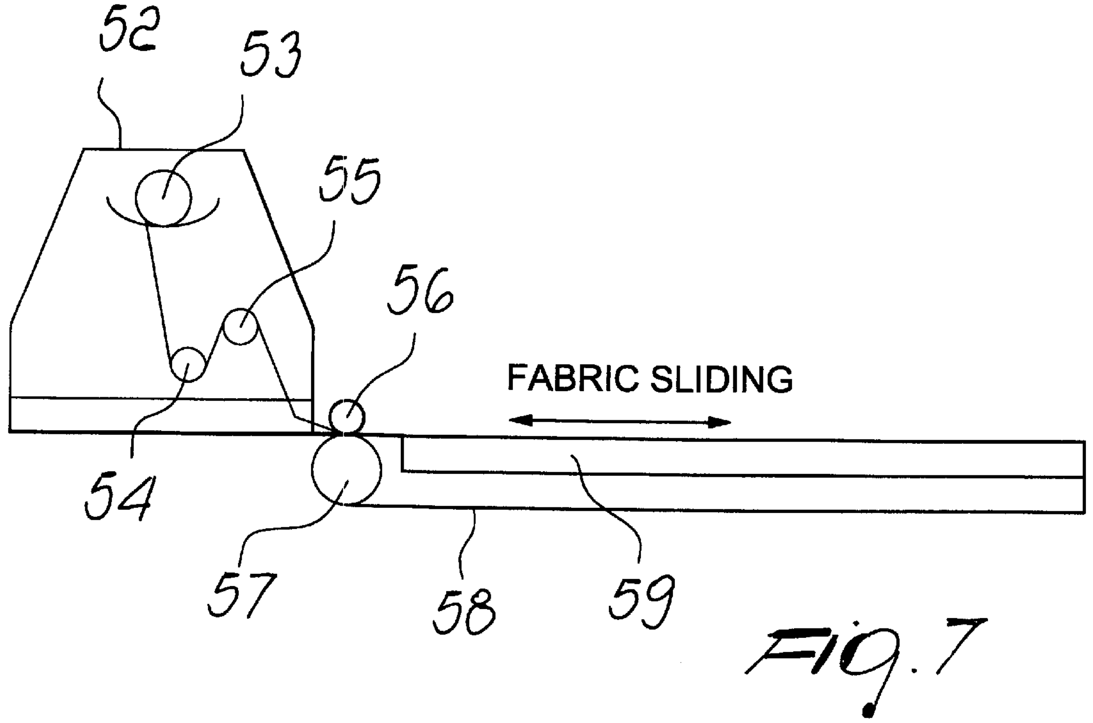
FIG. 7 is a side view of the fabric unrolling/roll-up unit in the configuration in which it is associated with the sliding table on which the fabric is made to advance.

With reference to FIG. 3, the system is composed of an automatic fabric storage system A, which is controlled by a computer which communicates with the overall management system MAIN. The store contains rolls of fabric 39, 42 which the system must remove in order to meet the demands of the production management system CED. The store, which has a limited number of rolls of fabric, communicates automatically with the general fabric store, from which it removes the rolls that it needs for current production. Said store can be configured sequentially (FIG. 4) or in parallel mode (FIG. 5). In the sequential mode (FIG. 4), the system is slower because in order to select the chosen fabric 39 it is necessary to scroll through all the rolls of fabric up to the chosen one Pa. If many items are manufactured using the same fabric, this system can still be effective, since the time required by the system to cut all the fabric is sufficient to allow a fresh roll of fabric to be present when it is required at the end of the current process. In the parallel mode, the system is instead very fast in any condition, even if a single item must be cut from each roll of fabric. The fabric access time of the parallel system is always the same, regardless of the position of the fabric inside the magazine i, j. In this method, the rolls of fabric are arranged in vertical columns, numbered 0 to N, which can move up or down. This movement allows to select the column from which the fabric roll is removed and place it in the upper position and to place all the other columns in the lower position. In this way, the fabric roll removal system can access, inside the store, only the fabric rolls that correspond to the elevated column. In this way, by means of a removal arm 46, it is possible to directly access the chosen roll without interfering with all the other rolls.

This method allows to access any roll of any other column in the same manner, by selecting the column from which the roll is to be removed and placing it in the upper position while placing all the other columns into the lower position.

The roll of fabric is removed by the movable arm 108 and by rotating about its fulcrum 109 it is moved into the position 110 which allows it to be deposited in the fabric unrolling/roll-up unit 112 in the position 111, from which the roll can begin to be unrolled onto the continuously moving conveyor which has a variable controlled speed 103. Said moving conveyor is composed of three separate moving conveyors 103, 104, 105, all of which operate synchronously with each other except for the conveyor 103, which can be operated separately if the fabric is to be rolled up after a production run has ended.

The conveyor 103 is the one that takes up the fabric and stabilizes it with respect to the conveyance table by means of the control photocells 50, 51 with the aid of the unrolling/roll-up unit 49 which, being able to move transversely in both directions with respect to the fabric advancement direction, allows to correct the small variations that might occur during laying and are caused merely by the strength characteristics of the fabric to be laid. Said unrolling/roll-up unit, by means of control and tensioning pulleys 54, 55, 56, 57, allows to keep the fabric under tension without deforming it, leaving the fibers that compose the fabric free from tension, and to send the fabric to the conveyor 58, 59 with a perfectly uniform speed.

Figure 8:
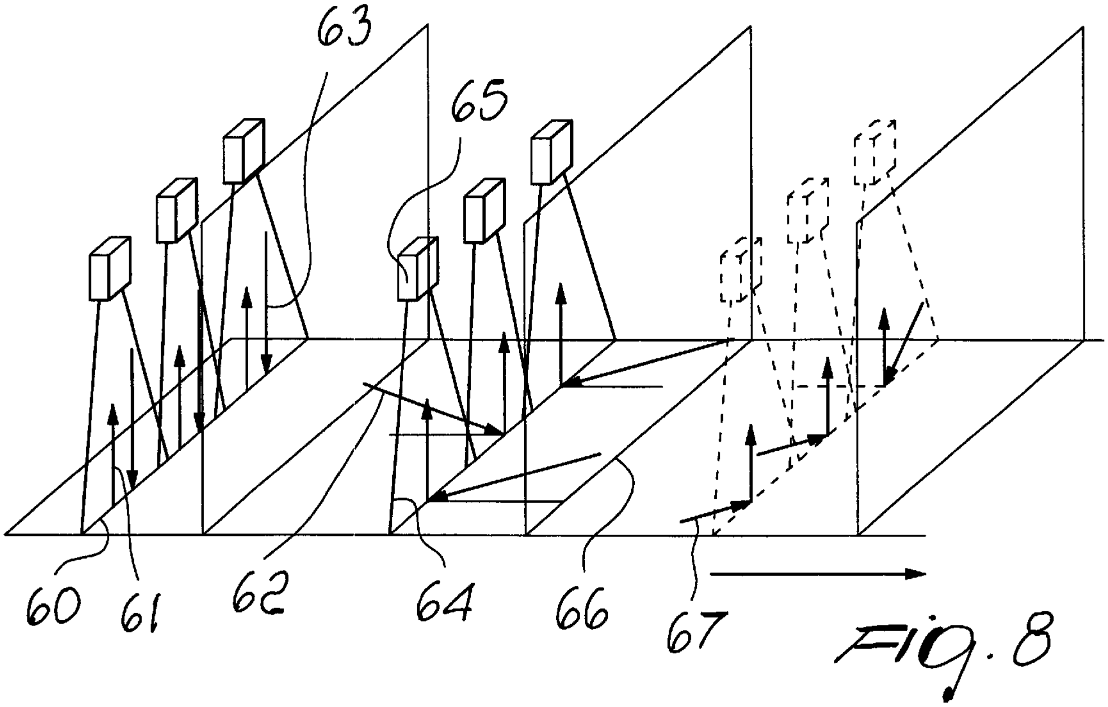
FIG. 8 is a view of an arrangement of the optical sensors for the linear sensing of the fabric and for storing said sensing in memory in the form of consecutive lines at the resolution required for the kind of fabric being acquired.

Once the fabric has been deposited onto the moving conveyor 103, 104, 105, which always moves continuously but at a variable speed caused by the different characteristics of the fabric and by the dimensions of the parts to be cut and ultimately by the perimetric characteristics of the pieces to be cut, the system conveys the fabric to the system for sensing the characteristics of the fabric (FIG. 8), which is composed of a set of linear video cameras 65 arranged so as to have a plurality of lightings 63, 62, 67 of the same line of fabric 66. Actually, the video cameras 65 are arranged along three sensing lines, depending on the type of lighting applied to the fabric, and specifically in the vertical case 63, in the parallel oblique case 62, and in the perpendicular oblique case 67. Comparison of these three or more sensing operations, if necessary, produces a highly precise indication, with an almost zero probability of error, of all the characteristics of the fabric and of its flaws, i.e., the characteristics that do not match the average description of said fabric.

Figure 9:
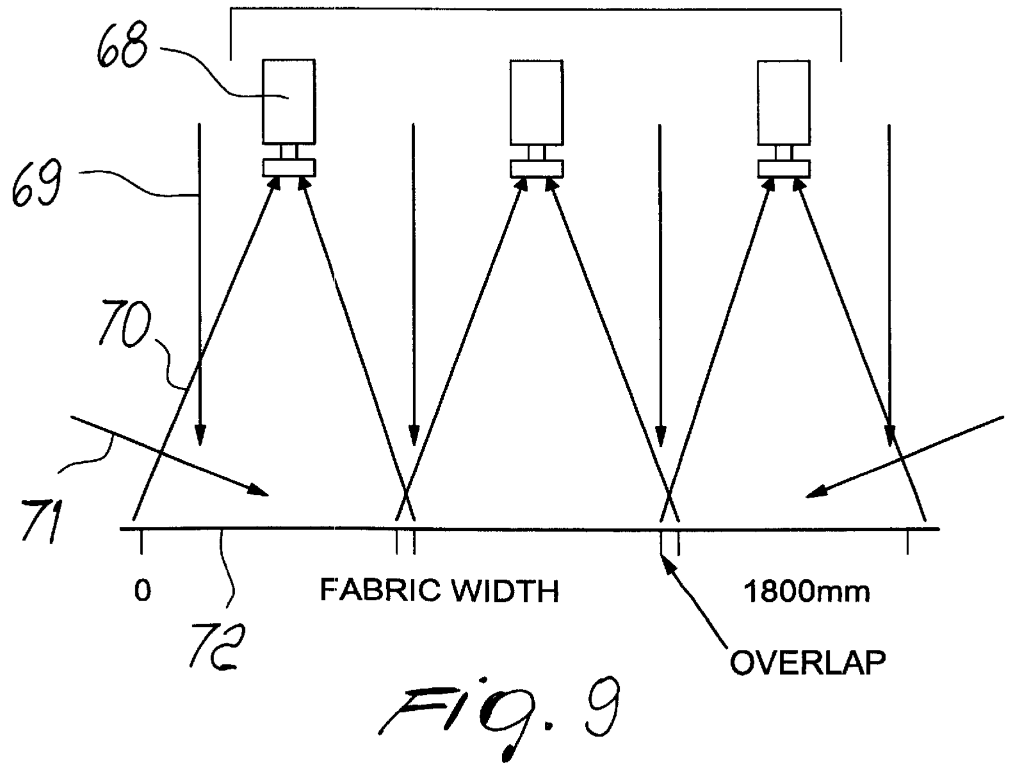
FIG. 9 is a view of a possible arrangement of the video cameras for the optical sensing of all the flaws and the color and geometric characteristics of the fabric.

The sensing operations do not occur with a single video camera but by aligning three video cameras (FIG. 9), wherein each video camera 68 senses a line a fabric over a length, termed sensing cone 70, which is equal to the need to achieve the chosen precision both in the fabric advancement direction and transversely thereto, which in the specific case can vary between 0.1 mm and 0.25 mm. The alignment of the video cameras 68 produces an overlap in the work areas of the resulting images, which must be filtered so as to eliminate this interference region by means of computational algorithms which allow to obtain a uniform image over the entire width of the fabric. Said line image is stored in the memory of the system in order to have a sequence of lines which is sufficient to perform a color analysis of the fabric. Depending on the sensed colors, which correspond to the different lightings performed, it is possible to obtain, by comparison, indications related to the geometry of the fabric and to any flaws that might be present internally.

Once the image has been acquired, highly sophisticated computational algorithms process said continuous image of the fabric in real time, in the period during which the acquired fabric passes from the acquisition step to the cutting step, i.e., in the region between the steps C and D in FIG. 3, in order to obtain a geometrically described image thereof. Said geometric image, which is the result of said processing, indicates the pattern of the fabric, provides information as to its periodic repetition, reports any flaws and their location 73, 78, reports whether there are stripes or checked patterns and, if so, whether the stripe remains unchanged along the fabric or changes shape, together with all the other information required for its complete management.

Once the characteristics of the fabric have been defined, again in real time, their description is passed to a very fast and complex computing system which is capable of handling, in real time, the depositing and optimization of the pieces to be cut, taking into account all the information concerning the fabric acquired in the previous step. Optimization is performed so as to comply with the characteristics of the item to be cut; all the parameters concerning the characteristics of the item are supplied by a model creation system CAD, to which the layout optimization system is connected in real time. The system must be connected not only to the system CAD but also to the system CED in order to receive in real time the number of items of that model to be produced, so as to lay them out along the entire length of the acquired fabric. All these operations are performed while the fabric is moving on the moving conveyor during the step between the acquisition of the fabric and the cutting system. The space between these two steps is constant and is a fixed parameter of the machine, while the time required to pass from one step to the next is variable and depends on the speed at which the conveyor is made to advance, so that if the fabric to be acquired or the item to be laid out is very complex, the system is capable of slowing the system in a fully automatic manner, so as to reach the cutting step exactly in time for the end of the computing of the optimum layout.

Figure 10:
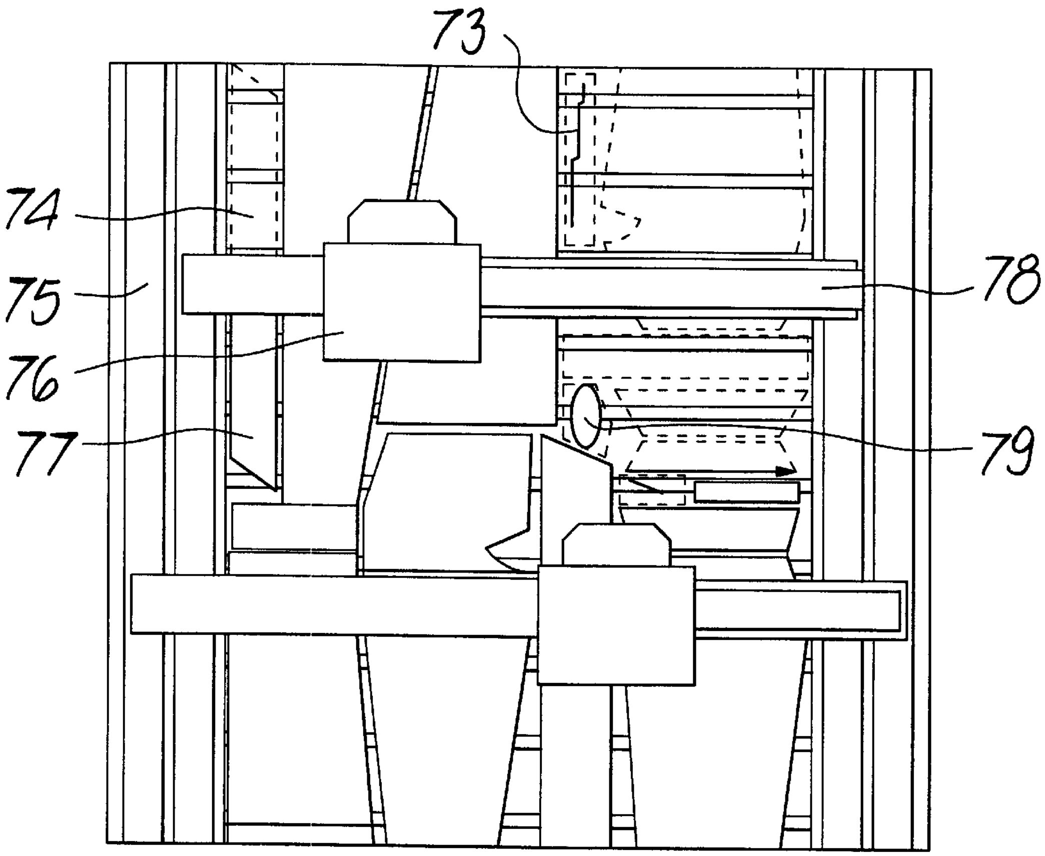
FIG. 10 is a view of a twin-head cutting system which allows to achieve speeds that allow to cut any item of clothing conveniently in single-layer mode.
Figure 11:
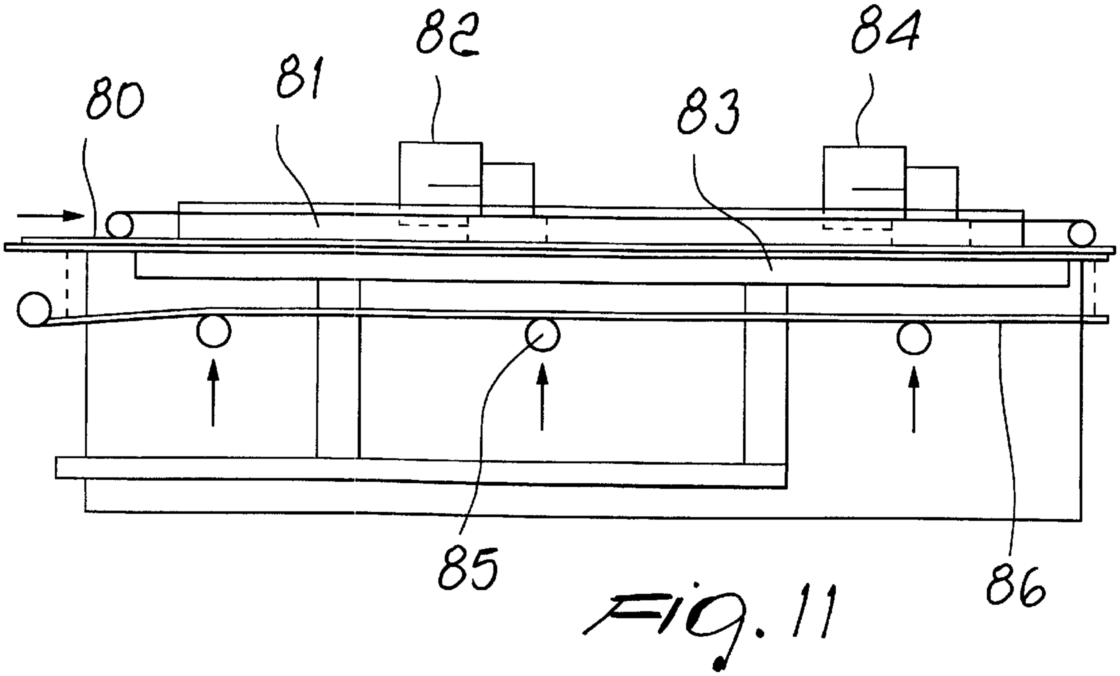
FIG. 11 is a side view of said twin-head cutting table, illustrating the suction chamber and the moving table for continuous cutting.

After the step for optimizing the pieces to be cut, the fabric arrives, again with a continuous cycle, at the cutting system (FIG. 10, FIG. 11), composed of a plurality of cutting heads 76 which are limited to two 82, 84 in the specific case for the sake of simplicity; each head operates on the entire cutting table asynchronously, and the heads are controlled by a computing system which optimizes the cutting path of both heads according to the path to be covered for each cutting head. In this manner, the two cutting heads never collide and can both work on the same piece to be cut if necessary. Cutting is performed while the fabric is moving and the cutting heads work so as to take into account the advancement speed of the fabric on the moving conveyor, following the variations thereof caused by the preceding steps.

The cutting system is composed of a suction system 83, which forces the layer of fabric to remain rested on the cutting table 80, which is composed of self-regenerating material or of a material which allows the blade 99 to penetrate to a thickness of no more than 4 millimeters.

Figure 13:
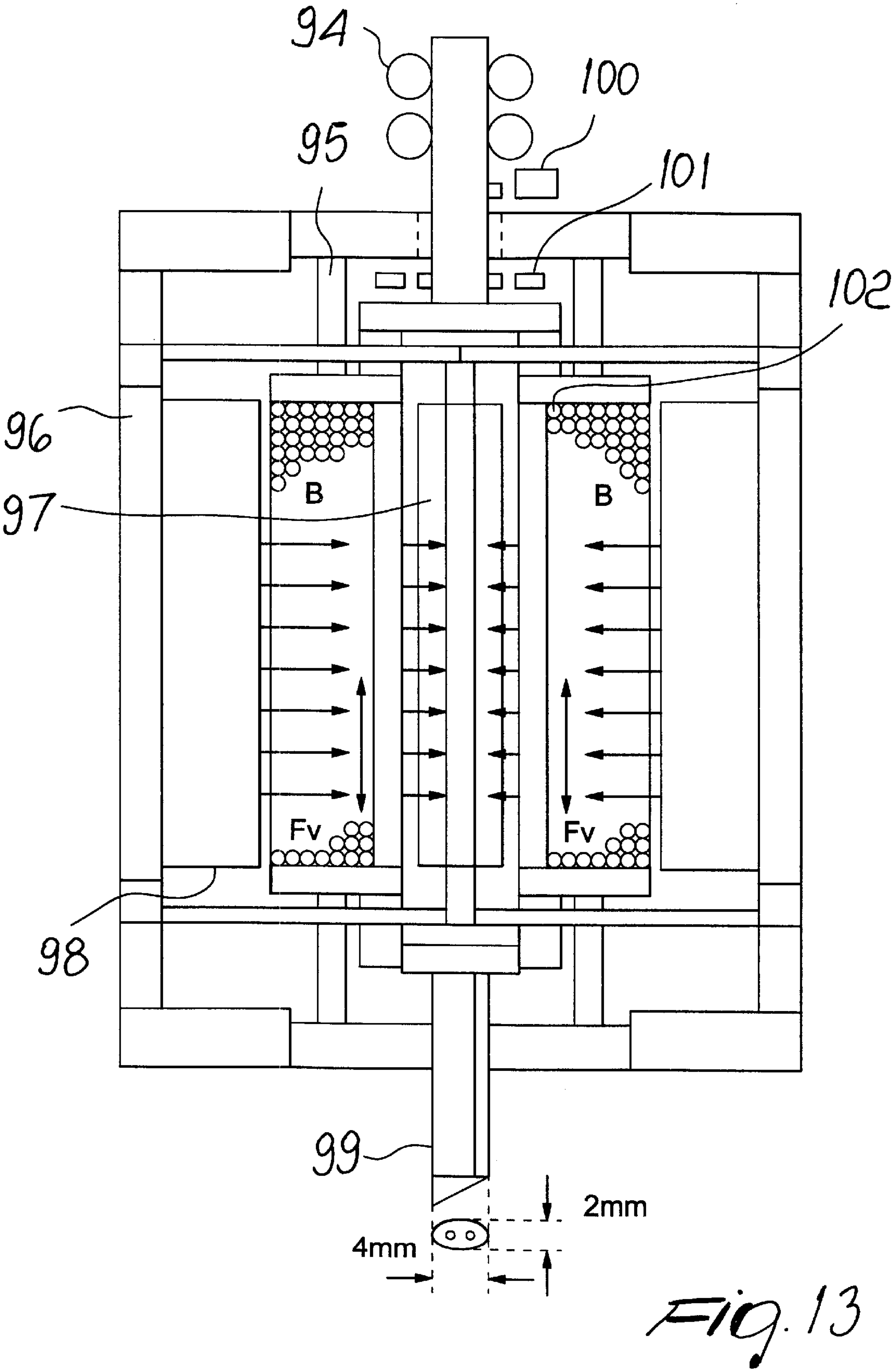
FIG. 13 is a diagram of the cutting head with a linear motor to be applied to the cutting table to obtain a high cutting performance from said table.
Figure 14:
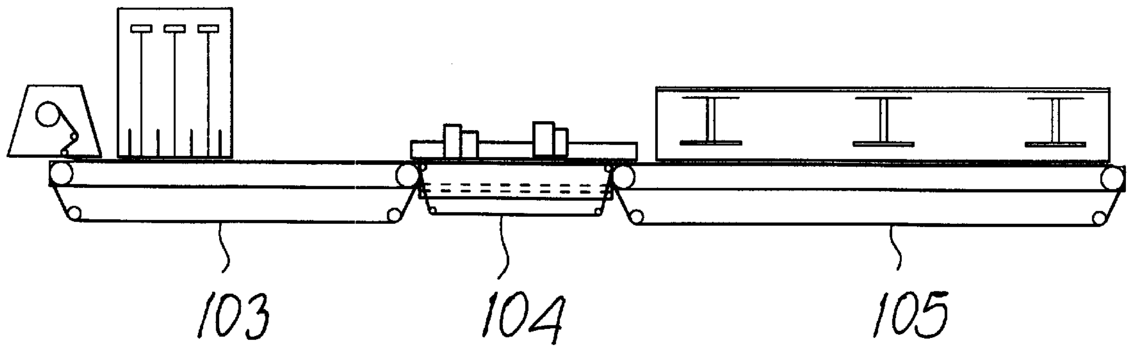
FIG. 14 is a diagram of the continuous variable-speed conveyor system for managing the movement of the fabric during the various steps of the cutting system.
Figure 15:
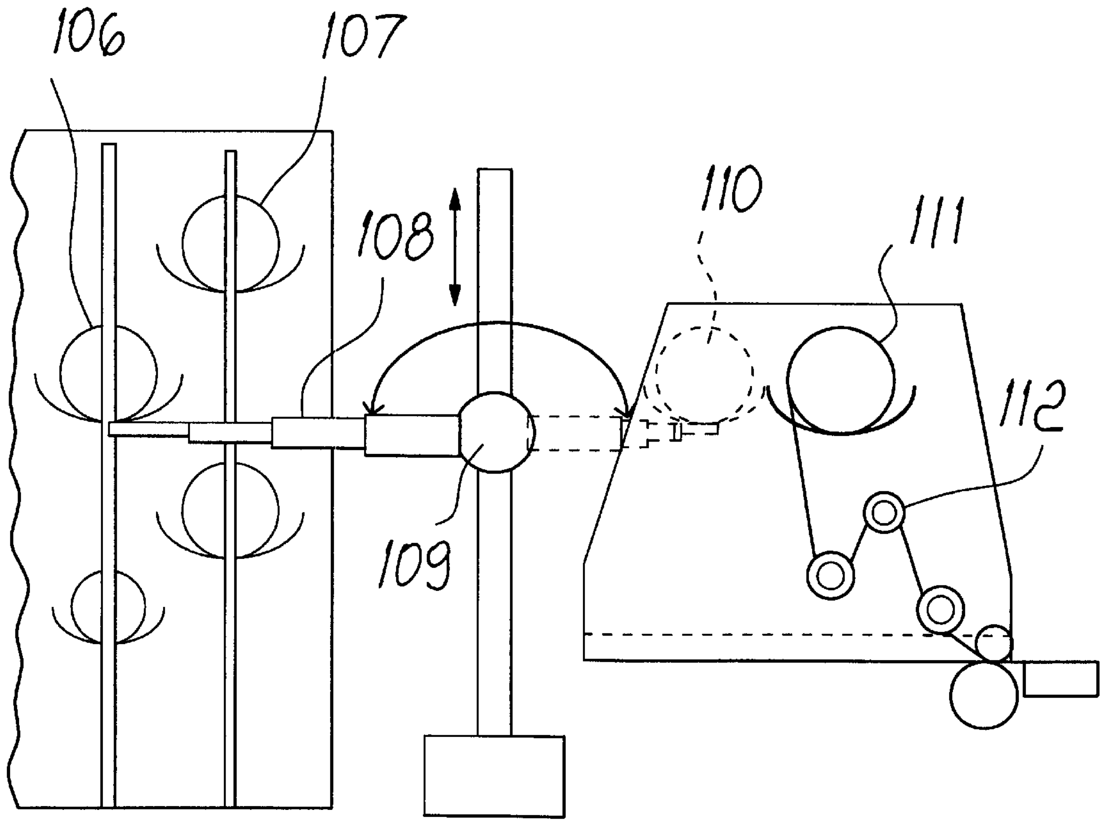
FIG. 15 is a view of the system for loading and unloading the store towards the system for unrolling/rolling up the fabric on the moving conveyor and viceversa.
Figure 16:
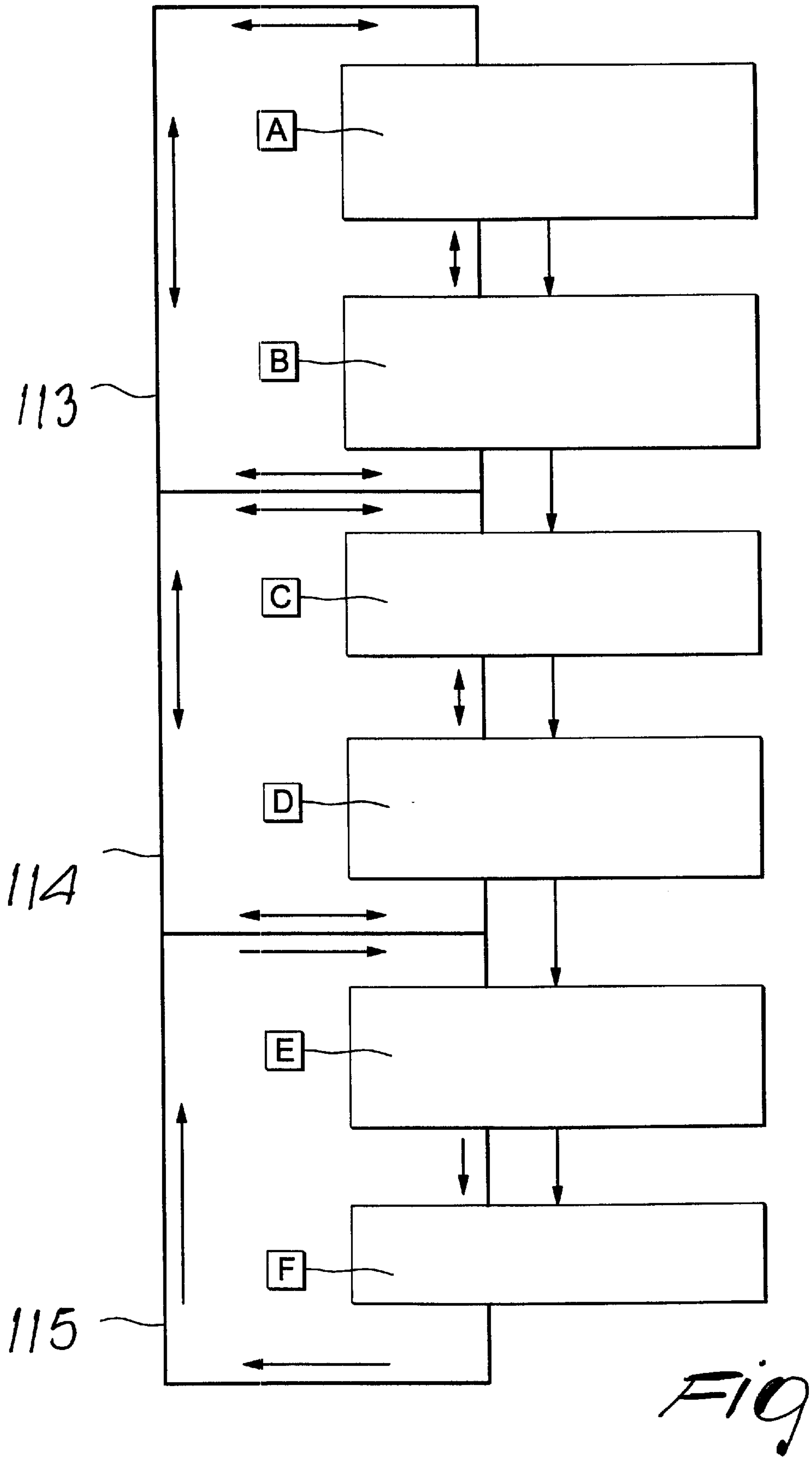
FIG. 16 is a view of a method for performing the continuous single-layer cutting of materials that are not inherently rigid and whose cutting requires perfect knowledge of their geometric, chromatic and defectiveness characteristics and all the other necessary characteristics in real time.
Figure 17:
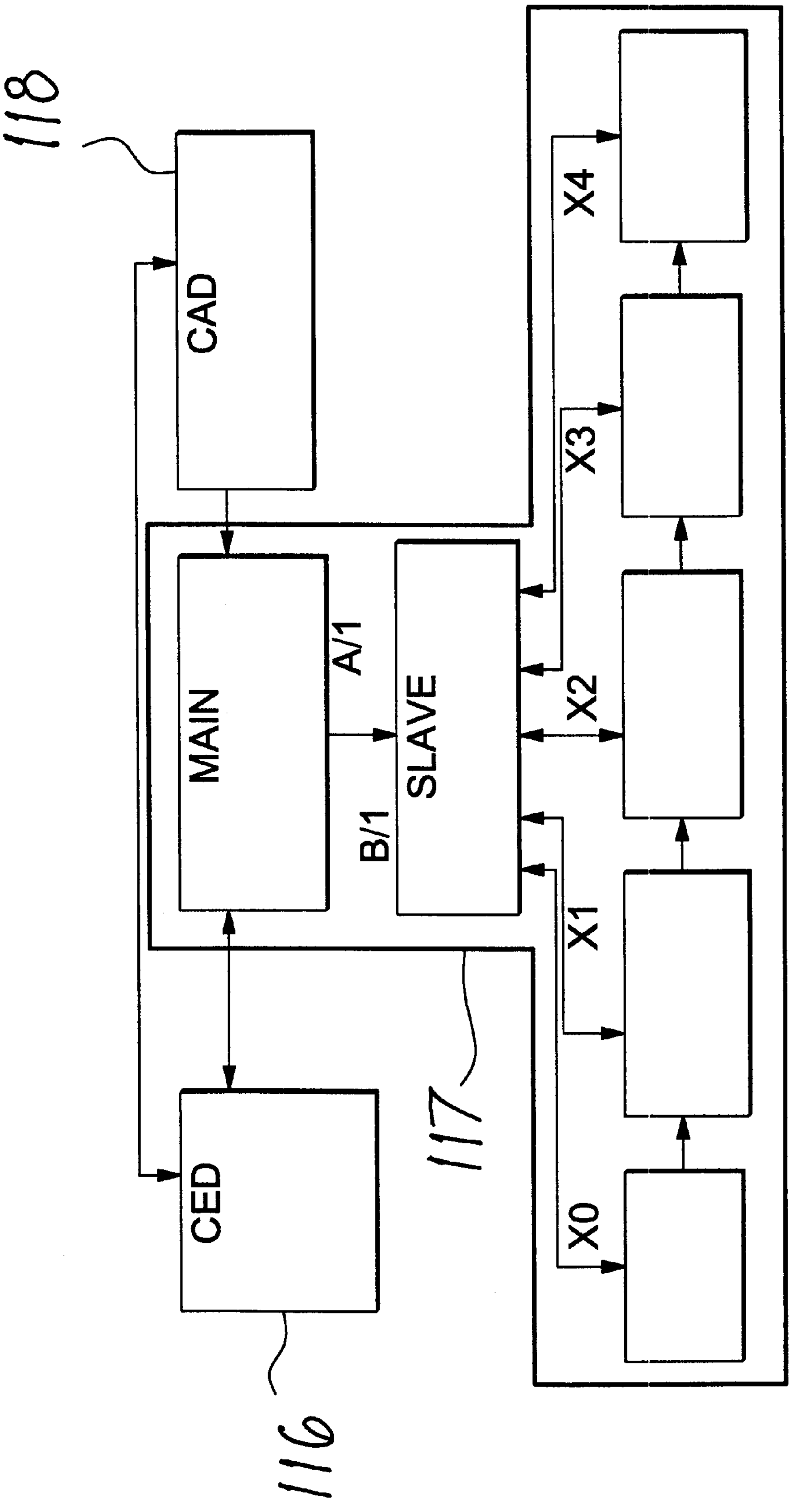
FIG. 17 is a view of the connection among the various parts of the apparatus according to the present invention with the CED system and the CAD system of the company.

The suction table 83 operates exclusively on the moving conveyor, so that the fabric continues to adhere perfectly during the cutting step. The cutting heads are equipped with a blade-type cutting system which can be of the conventional type or a linear motor (FIG. 13), capable of producing very high cutting frequencies and with a very short vertical path of the cutting blade 99, measuring 1 or 2 millimeters. The two cutting heads work on the same cutting table and travel either on two separate sliders 75 or on the same slider, depending on whether movement occurs on the beam that supports the cutting heads (same slider) or is generated by a transmission generated at the level of the sliders by means of a belt drive or other equivalent mechanisms (two separate sliders).

Figure 12:
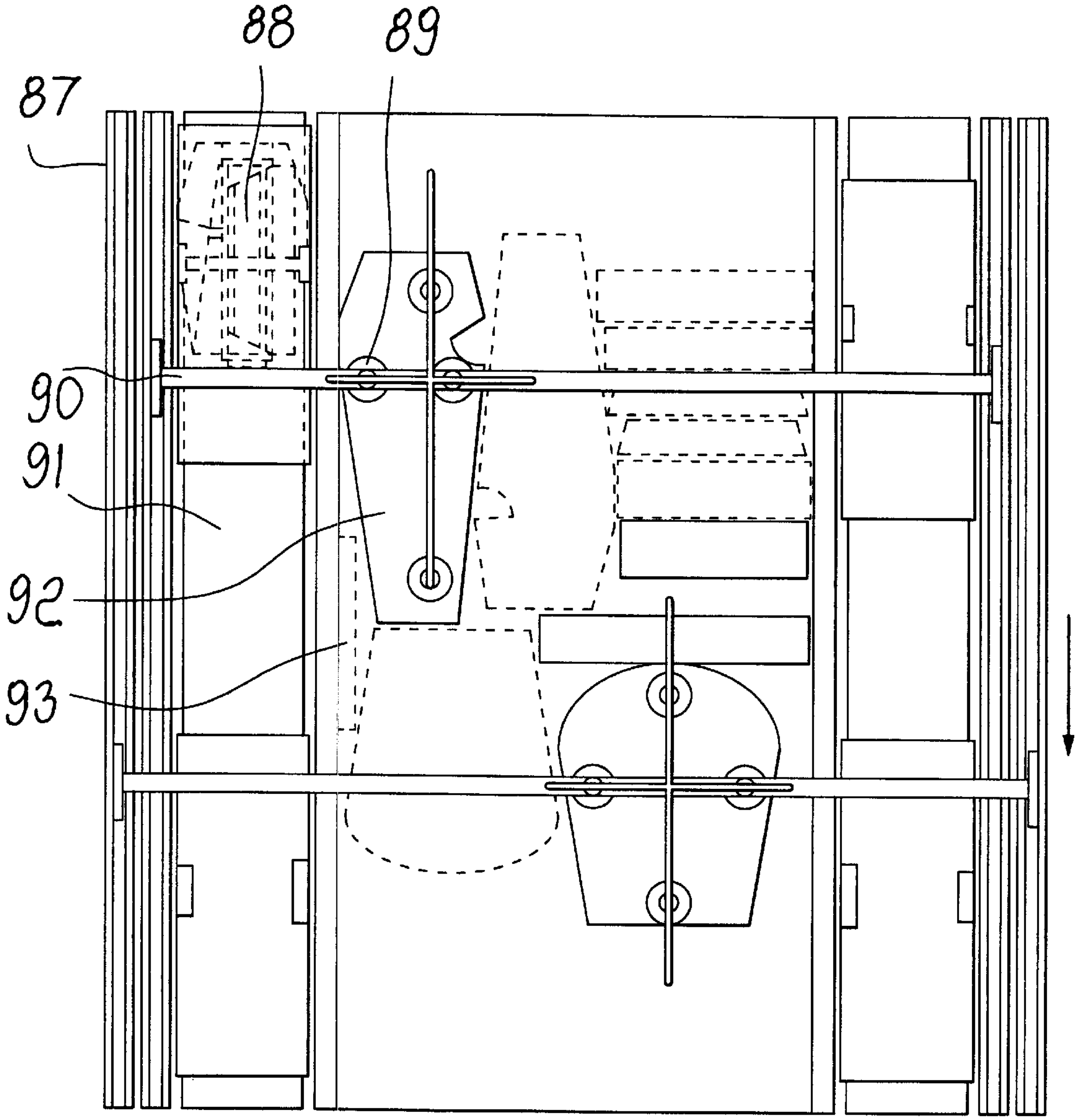
FIG. 12 is a view of the automatic system for removing cut pieces continuously to pack them in single-item mode or in a pack according to the production requirements of the company.

Once piece cutting 74, 77 of the item to be produced has been completed, the cut fabric is sent to the system for removing said pieces (FIG. 12), so that said pieces are packaged to move on to the subsequent assembly step. Said packing system can operate in two modes which are controlled by a program that allows to collect the pieces in single-item mode or as a pack.

In the first case, all the pieces that compose an item are removed 89 by a removal system capable of adapting to the various geometries of the pieces 92, 93 and are deposited in a suitable container 88 which runs to the sides of the removal system and with the same speed as the moving conveyor, so that each container contains a complete item. When all the pieces that compose an item have been deposited into the container, an automatic packing system binds together all the pieces that compose the item, so that it can be handled as a single unit and sent automatically to the subsequent processes.

What is claimed is:

1. A method for automatically cutting, in a continuous, real-time controlled operation, a material that can be laid over a continuously movable transport surface, the method comprising, in operational sequence, the steps of:

a) accommodating, in an automatic material magazine, materials to be cut in a predefined sequence;

b) removing from the material magazine and sending to a deposition system for subsequent deposition onto a continuously-moving transport surface, the material to be cut;

c) automatically depositing the material to be cut, so as to lay out in a layer on the transport surface which is moving continuously and at a variable speed;

d) acquiring all the geometric characteristics and defectiveness characteristics of a material surface to be cut and storing all said geometric and defectiveness characteristics in an electronic memory so as to be available for automatic, in real time, retrieval and processing;

e) optimizing the layout of shapes to be cut onto the material surface acquired in the previous step, in a fully automatic manner, by taking simultaneously into account all said geometric and defectiveness characteristics of the acquired material surface and outline characteristics regarding single product shapes and elementary piece shapes of complex products to be cut;

f) cutting said material laying out on said transport surface while moving continuously and at a variable speed therewith, the transport surface speed being adjustable so that the cutting step is started upon ending of the previous optimizing step;

g) removing from said continuously-moving transport surface the shapes cut during the previous step, and selectively depositing, either individually the single product shapes or, in respective packs, the elementary piece shapes for constituting a complex product; and h) continuously exchanging information concerning the correct operation of the entire production sequence between a computerized control system and an automatic production control and data management system, and on the basis of said information controlling, in real time, the entire synchronization of the production operation.

2. The method of claim 1, wherein, in said accommodation step, the materials for current production are accommodated in said automatic store in rolls of material, said material removing step comprising moving a selected roll of material to be cut to an unrolling/roll-up unit and unrolling the material to be cut for deposition thereof, on said transport surface, during said deposition step.

3. The method of claim 2, further comprising the step of:

i) upon reaching a preset number of shapes cut, rolling up the material in current production, substituting the roll of material with a new roll of new material to be cut which is selected from the material roll magazine, and unrolling from the new roll, for deposition in said deposition step, the new material to be cut on said transport surface.

4. The method according to claim 1, wherein the step of continuously exchanging information concerning the correct operation of the entire production sequence comprises exchanging data, regarding characteristics of the product shapes to be cut and product delivery orders, among the control and management system, a model creation system, and respectively a production management system.

5. The method according to claim 1, wherein the step of automatically depositing the material to be cut in a layer comprises depositing the material on a conveyor means which is moving continuously and at a variable speed, said conveyor means constituting said continuously-moving transport surface.

6. The method according to claim 1, further comprising the step of forming the respective packs of elementary piece shapes for constituting a complex product in a container and subsequently individually packing each single pack.

7. An apparatus for automatically cutting in a continuous, real-time controlled operation, a material laid over a continuously movable transport surface, comprising:

a) a high-speed automatic material roll magazine of the sequential or parallel type allowing management and removal therefrom of rolls of material to be used for production and, respectively, return of rolls of uncut material, the magazine communicating operatively with a general fabric store for automatic transfer to said magazine of said rolls of material to be used for production;

b) a conveyor means, movable continuously with an automatically controllable variable speed, for supporting and transporting the material to be cut, said conveyor means constituting said continuously movable transport surface;

c) a material unrolling/roll-up unit for unrolling onto said conveyor means, and respectively, for rolling up the uncut material from said conveyor means, according to cutting requirements;

d) an automatic removal and deposition system for transferring from the roll magazine to the material unrolling/roll-up unit, respective rolls of material to be unrolled and cut, and back to said roll magazine, for storage, the rolls of uncut, rolled up material;

e) an automatic characteristic acquiring device for acquiring geometric and defectiveness characteristics of a material surface to be cut during continuous laying of the material on the conveyor means and for storing all said geometric and defectiveness characteristics in an electronic memory so as to be available for automatic, in real time, retrieval and processing;

f) an automatic layout system which performs the layout of shapes to be cut onto the material surface acquired by said acquiring device in a fully automatic manner, by taking simultaneously into account all said geometric and defectiveness characteristics of the acquired material surface and outline characteristics of single product shapes and elementary piece shapes of complex products to be cut;

g) a cutting system for automatically cutting the material laying out on said conveyor means while said conveyor means and the material laying thereon are in continuous motion;

h) a selection and removal system for automatically removing from said continuously moving conveyor means the shapes cut, and for selectively depositing, either individually single product cut shapes or, in respective packs, the elementary piece shapes for constituting a complex product; and i) an automatic production control and data management system, capable, on the basis of information received from a model creation system, and respectively a production management system to decide in a fully automatic manner selections of products to be produced in accordance with production requirements; and j) a computerized control system for controlling the correct operation of the entire production sequence, said computerized control system continuously exchanging information concerning the correct operation of said entire production sequence with said production control and data management system, to control, on the basis of said information, in real time, the entire synchronization of the production operation.

8. The apparatus of claim 7, wherein said material unrolling/roll-up unit is movable transversely with respect to material advancement direction to correct laying out evenness of the material over said conveyor means, and comprises roll-up means for rolling up the remaining uncut material and automatically marking on the wound up roll the remaining length of uncut material.

9. The apparatus according to claim 7, wherein said conveyor means comprise three independently moving conveyors operatable synchronously, with a first one of said conveyors being further operatable separately for taking up and stabilizing the motion of the unrolled material with respect to the other conveyors and respectively for allowing rolling up of the uncut material.

10. The apparatus according to claim 7, wherein said automatic removal and deposition system comprises a removal arm for picking up and transferring from the roll magazine to the material unrolling/roll-up unit and back, a selected roll of material.

11. The apparatus according to claim 7, wherein said characteristic acquiring device comprises a set of video cameras arranged so as to have views of a same line of the material along a plurality of sensing lines.

12. The apparatus according to claim 7, wherein said automatic layout system comprises a computing system connected in real time with said model creation system.

13. The apparatus according to claim 7, wherein said cutting system comprises a plurality of cutting heads, a computing system for establishing an optimum cutting path for said cutting heads while the material is in movement, and a suction system to retain the material adhering to said conveyor means, said cutting heads being provided with a blade cutting system.

14. The apparatus according to claim 7, wherein said selection and removal system comprises a container for receiving the cut shapes of material, said container running sideways of said removal system with a speed equal to that of said conveyor means.

* * * * *